UNITED STATES PATENT OFFICE.

EDWIN BURT, OF EL ORO, MEXICO.

PROCESS OF FILTRATION.

961,713.

No Drawing.

Specification of Letters Patent. Patented June 14, 1910.

Application filed August 26, 1909. Serial No. 514,977.

*To all whom it may concern:*

Be it known that I, EDWIN BURT, a citizen of the United States, and a resident of El Oro, Estado de Mexico, Mexico, have invented a certain new and Improved Process of Filtration, of which the following is a specification.

This invention relates to a process of filtration and relates particularly to a process of filtering ore slimes and the like in a filter of the type comprising a rotatable shell, a filtering medium therein and means for rotating said shell during the process of filtration, whereby as filtration progresses, a filter cake consisting of successive layers will be deposited on the filtering medium.

I am aware that it is old to effect filtration in filters of this general type by applying a suction to the contents of the filter at the outer side of the filtering medium. With this process of filtration, however, the filter cake deposited on the filtering medium is so weak that it will fall off from said filtering medium as soon as rotation of the filter ceases or the suction is discontinued. An example of this method of filtration is found in the patent to Charles H. Webb, No. 768,319, dated August 23, 1904, the specification of which states (p. 3, line 1) that "the layer of slime or residue remains on the filter cloth so long as the barrel is revolving and the difference of pressure exists. But it falls immediately to the bottom of the vat on cessation of these conditions." Thus, in case it is desired to subject the contents of the filter to different treatments with wash solutions, wash waters, and the like, in order to extract all of the "values" from the ore, the filter cake is dislodged from the filtering medium at each successive treatment, necessitating that it be repulped and the filter cake reformed as many times as it is subjected to different treatments. This process of treatment is objectionable on account of the length of time required to properly treat the ore in accordance with this process, due to the time required for repulping and reforming the filter cake between successive treatments. It has been found in practice that equally good results can be obtained and much time saved in the operation by treating the ore as it is deposited upon the filtering medium in the form of filter cake. To this end it has been proposed to prevent the filter cake from falling off from the filtering medium while the various wash solutions and wash waters are being admitted to the filter shell by introducing an air pressure in the filter, which will operate, in an obvious manner, to hold the filter cake in position. While this process prevents all loss of time due to repulping and reforming the filter cake, it nevertheless requires attention on the part of the operator to admit compressed air to the filter until a desired pressure is attained and the shutting off of the air, all of which occupies time and distracts the attention of the operator from the main process.

The object of the present invention is, therefore, to provide an improved process of filtration in filters of this general type whereby the filter cake deposited on the filtering medium will be sufficiently firm and strong to retain its position on the filtering medium independent of air pressure from within or suction from without, whereby all loss of time, excepting that required for admitting the various wash solutions and wash waters to the filter is avoided. To this end my improved process comprises the various steps hereinafter described and claimed.

A filter particularly designed and adapted for the practice of my improved process of filtration is fully shown and described in U. S. Letters Patent No. 931,267, issued to me on August 17, 1909, to which reference is made.

My improved process of filtration is as follows: The ore slime or other material in a semi-liquid state is run into the filter shell until said filter shell is filled to a desired extent—say until it is about one-half full. Air or fluid pressure is then generated in the filter shell, said air pressure being preferably increased gradually as filtration progresses, from a desired initial pressure of say 10 pounds, to a desired final pressure of 40 to 50 pounds. The desired initial fluid pressure in the filter shell may be generated either by the introduction into said filter shell of fluid under pressure or by compression of fluid contained in said filter shell by the admission into said filter shell of the ore slime to be filtered. Such compression of fluid contained in the filter shell can readily be effected either by locating the slime tank at a higher level than the filter shell, or by the use of a pump for forcing the ore slime into said filter shell.

During the filtering operation, the filter shell is rotated slowly, a desirable rate of rotation being about 15 revolutions per minute. Obviously, as the shell of the filter rotates and the liquid portion of the slime contained therein is forced out, the solid portion of said slime will deposit on the filter in the form of successive comparatively thin layers, and the air pressure within the shell of the filter, operating on these layers in succession, will compress or compact them into a cake which will be sufficiently firm and strong to retain its position on the filtering medium without being supported either by air pressure from within or suction from without. In fact, where filtration is effected under a final air pressure of from 40 to 50 pounds, I have found that it is necessary to break down or dislodge the filter cake by mechanical means when it is desired to discharge the same from the filter. When the liquid portion of the slime contained in the filter has all been forced out, the filter cake may be subjected to any desired number of treatments with wash solutions and wash waters. To effect such treatments, wash solutions or wash waters are admitted to the shell of the filter and the filtering process repeated to force such wash solutions and wash waters through the filter cake, all of which can be done without stopping the operation of the filter for a greater length of time than is required for admitting the wash solutions and wash waters to the filter shell and forcing them through the filter cake on the filtering medium. After all of the "values" have been extracted from the ore, the filter cake is dislodged from the filtering medium and is discharged from the filter shell.

While my invention contemplates the use of any desired means for thus dislodging the filter cake, or discharging it from the filter, I prefer the means shown and described in my said Letters Patent No. 931,267, see particularly that portion of the specification of said patent beginning on line 35 of page 4 thereof, to and including line 18 of page 5 thereof.

I claim—

1. A process of filtration in a filter of the type comprising a rotatable shell, a filtering medium therein, and means for rotating said shell, which consists in admitting into the filter shell a sufficient quantity of the material to be treated to only partly fill the same, generating a fluid pressure within said filter shell, whereby the contents of said filter shell will be subjected to pressure, rotating said filter shell during filtration whereby a filter cake will be deposited on the filtering medium consisting of successive layers which will be separately subjected to pressure as formed, thus forming a filter cake of sufficient strength and firmness to retain its position on the surface of the filtering medium unsupported, and treating said filter cake with wash solutions while on said filtering medium, substantially as described.

2. A process of filtration in a filter of the type comprising a rotatable shell, a filtering medium therein, and means for rotating said shell, which consists in admitting into the filter shell a sufficient quantity of the material to be treated to only partly fill the same, generating a fluid pressure within said filter shell, whereby the contents of said filter shell will be subjected to pressure, gradually increasing the fluid pressure during the filtering operation from a desired initial pressure to a desired maximum pressure, rotating said filter shell during filtration whereby a filter cake will be deposited on the filtering medium consisting of successive layers which will be separately subjected to pressure as formed, thus forming a filter cake of sufficient strength and firmness to retain its position on the surface of the filtering medium unsupported, and treating said filter cake with wash solutions while on said filtering medium, substantially as described.

3. A process of filtration in a filter of the type comprising a rotatable shell, a filtering medium therein, and means for rotating said shell, which consists in introducing into the filter shell a sufficient quantity of the material to be treated to only partly fill the same, generating a fluid pressure within said filter shell, whereby the contents of said filter shell will be subjected to pressure, rotating said filter shell during filtration whereby a filter cake will be deposited on the filtering medium consisting of successive layers which will be separately subjected to pressure as formed, thus forming a filter cake of sufficient strength and firmness to retain its position on the surface of the filtering medium unsupported, treating said filter cake with wash solutions while on said filtering medium, and dislodging said filter cake from said filtering medium by mechanical means and discharging the same, substantially as described.

In testimony, that I claim the foregoing as my invention, I affix my signature in presence of two subscribing witnesses, this 14th day of August, A. D. 1909.

EDWIN BURT.

Witnesses:
CLARENCE EDGAR RHODES,
PHILIP MORTON KEEFFE.